US008208481B2

(12) United States Patent
Ellis et al.

(10) Patent No.: US 8,208,481 B2
(45) Date of Patent: Jun. 26, 2012

(54) DETERMINATION OF PACKET LOSS LOCATIONS

(75) Inventors: John Gwilym Ellis, Pleasanton, CA (US); Ying Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/340,311

(22) Filed: Dec. 19, 2008

(65) Prior Publication Data

US 2010/0157788 A1 Jun. 24, 2010

(51) Int. Cl.
H04L 12/56 (2006.01)
(52) U.S. Cl. ........................................ 370/408; 370/255
(58) Field of Classification Search .................. 370/248, 370/395.52, 236, 408; 709/250, 203; 725/109, 725/38; 716/5
See application file for complete search history.

(56) References Cited

U.S. PATENT DOCUMENTS

| | | | |
|---|---|---|---|
| 6,188,674 B1 | 2/2001 | Chen et al. | 370/252 |
| 6,269,080 B1* | 7/2001 | Kumar | 370/236 |
| 6,693,907 B1 | 2/2004 | Wesley et al. | 370/390 |
| 7,072,305 B1 | 7/2006 | Gregson | 370/241 |
| 2004/0255049 A1* | 12/2004 | Italiano et al. | 709/250 |
| 2006/0288318 A1* | 12/2006 | Wright et al. | 716/5 |
| 2007/0019559 A1* | 1/2007 | Pittelli et al. | 370/248 |
| 2007/0097987 A1* | 5/2007 | Rey et al. | 370/395.52 |
| 2009/0119706 A1* | 5/2009 | Hope et al. | 725/38 |
| 2009/0274160 A1* | 11/2009 | Yanagihara | 370/408 |
| 2010/0138885 A1* | 6/2010 | Haimi-Cohen | 725/109 |
| 2010/0146040 A1* | 6/2010 | Ramakrishnan et al. | 709/203 |

OTHER PUBLICATIONS

Adams, A., Bu, T., Cáceres, R., Duffield, N., Friedman, T., Horowitz, J., Lo Presti, F., Moon, S.B., Paxson, V., Towsley, D., The Use of End-to-end Multicast Measurements for Characterizing Internal Network Behavior, DARPA and Air Force Research Laboratory, Feb. 15, 2000, pp. 1-10.
Cáceres, R., Duffield, N.G., Horowitz, J., Towsley, D., Multicast-Based Inference of Network-Internal Loss Characteristics, www.kiskeya.net, downloaded Dec. 16, 2008, pp. 1-30.
Duffield, N.G., Horowitz, J., Lo Presti, F., Towsley, D., Multicast Topology Inference From Measured End-to-End Loss, IEEE Transactions on Information Theory, Jan. 2002, pp. 26-45, vol. 48, No. 1.
Arya, Vijay, Duffield, N.G., Veitch, Darryl, Multicast Inference of Temporal Loss Characteristics, www.cubinlab.ee.unimelb.edu.au, Feb. 28, 2007, pp. 1-22.
Alstrup, Stephen, Kaplan, Haim, Gavoille, Cyril, Rauhe, Theis, Nearest Common Ancestors: A Survey and a New Distributed Algorithm, ACM Press, Aug. 10-13, 2002, pp. 1-7.

(Continued)

*Primary Examiner* — Kwang B Yao
*Assistant Examiner* — Syed M Bokhari
(74) *Attorney, Agent, or Firm* — Brinks Hofer Gilson & Lione (57) ABSTRACT

In one embodiment, a system may determine receiver identifiers to identify affected receivers, where each of affected receivers failed to receive a packet identified within a packet stream. A loss signature may identify the packet. Each of the affected receivers may be identified by a corresponding one of the receiver identifiers. The system may also determine a packet loss location of the packet from a network topology tree. The network topology tree may include a model of a logical network over which the packet stream was transmitted from a stream source to the affected receivers. The packet loss location may correspond to a lowest common ancestor node of at least two of the affected receivers.

20 Claims, 5 Drawing Sheets

OTHER PUBLICATIONS

Harel, Dov, Tarjan, Robert Endre, Fast Algorithms for Finding Nearest Common Ancestors, Society for Industrial and Applied Mathematics, SIAM J. Comput., vol. 13, No. 2, May 1984, pp. 338-355.

Bender, Michael A., Farach-Colton, Martin, The LCA Problem Revisted, Proceedings of the 4th Latin American Symposium on Theoretical Informatics, Springer-Verlag, May 16, 2000, pp. 1-8.

Prof. Erik Demaine, 6.897: Advanced Data Structures, Lecture 1.1, Apr. 2, 2003, pp. 1-13.

Ott, J., Chesterfield, J., Schooler, E., DRAFT-IETF-AVT-RTCPSSM-17, RTCP Extensions for Single-Source Multicast Sessions with Unicast Feedback, IETF, Jan. 7, 2008, pp. 1-118.

ISO/IEC 13818-1, Information Technology—Generic Coding of Moving Pictures and Associated Audio Information: Systems, ISO/IEC, Dec. 1, 2000, pp. 1-174, Second edition.

Schulzrinne, H., Casner, S., Frederick, R., Jacobson, V., RFC3550, RTP: A Transport Protocol for Real-Time Applications, The Internet Society, Jul. 2003, pp. 1-131.

Friedman, T., Cáceres, R., Clark, A., RFC3611—RTP Control Protocol Extended Reports (RTCP XR), The Internet Society, Nov. 2003, pp. 1-63.

* cited by examiner

DETERMINATION OF PACKET LOSS LOCATIONS

TECHNICAL FIELD

The present disclosure relates generally to communication networks and, more specifically, to packet loss.

BACKGROUND

Multicast packet network networks are increasingly being used to carry and deliver broadcast quality live video. In some examples, video may be digitally encoded using a compression standard, such as Moving Pictures Export Group (MPEG) H264 part 10. The encoded video may be encapsulated in a Packetized Elementary Stream (PES). Furthermore, multiple packets within the PES may be encapsulated in an Internet Protocol (IP) packet for transport between, for example, a distribution hub and a Set Top Box (STB). In some configurations, multicast technology may be used to distribute the same video streams simultaneously to 100,000 Internet Protocol Television (IPTV) STBs. Unlike many other types of media, digital video is extremely sensitive to lost packets. Therefore, IPTV networks may be engineered to achieve packet loss rates better than one in $10^6$. In some examples, a provider's network may simultaneously offer 250 or more channels. In an IPTV network where video is delivered over IP all the way to the STB, one channel may be mapped to one multicast group. Thus, a large number of multicast groups may exist at any one time in a single network. Furthermore, such a network may include hundreds of routers.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DESCRIPTION OF EXAMPLE EMBODIMENTS

Overview

By way of introduction, the example embodiments described below include a system, logic encoded in a computer readable media, and a method to locate a source of a packet loss.

According to a first embodiment, a system may determine receiver identifiers to identify affected receivers, where each of the affected receivers failed to receive a packet identified within a packet stream. A loss signature may identify the packet that the affected receivers failed to receive. The system may also determine a packet loss location of the at least one packet from a network topology tree. The network topology tree may include a model of a logical network over which the packet stream was transmitted from a stream source to the affected receivers. The packet loss location may correspond to a lowest common ancestor node of at least two of the affected receivers.

In a second embodiment, logic encoded on a tangible medium is provided. The encoded logic, when executed, may determine receiver identifiers to identify two or more affected receivers, where each of the affected receivers failed to receive a packet identified within a packet stream. A failure to receive the packet was reported by the affected receivers. The encoded logic, when executed, may further determine a packet loss location of the packet from a network topology tree. The network topology tree may include a model of a logical network over which the packet stream was transmitted. The packet loss location may correspond to a lowest common ancestor of at least two of the affected receivers.

In a third embodiment, a method is provided. Loss signatures may be received from a processor in a network. A loss signature from among the loss signatures may be determined, where the loss signature identifies, within a packet stream, at least one packet failed to be received by each of two or more affected receivers in the network. A packet loss location of the at least one packet may be determined from a network topology tree of the network. The network topology tree may include a model of a stream source of the packet stream and the affected receivers. The packet loss location may be determined as a lowest common ancestor of at least two of the affected receivers.

The present invention is defined by the following claims, and nothing in this section should be taken as a limitation on those claims. Further aspects and advantages of the invention are discussed below in conjunction with the example embodiments.

Example Embodiments

An example of an issue facing a network operator is to be aware of problems in the network that could result in the corruption of the video streams. For example, if a particular video channel is suffering from dropped packets, how does the operator determine where these packet losses are occurring? The existing generation of routers and switches cannot even determine if an individual packet stream has been corrupted, much less where in the network the corruption occurred.

Figure 1:
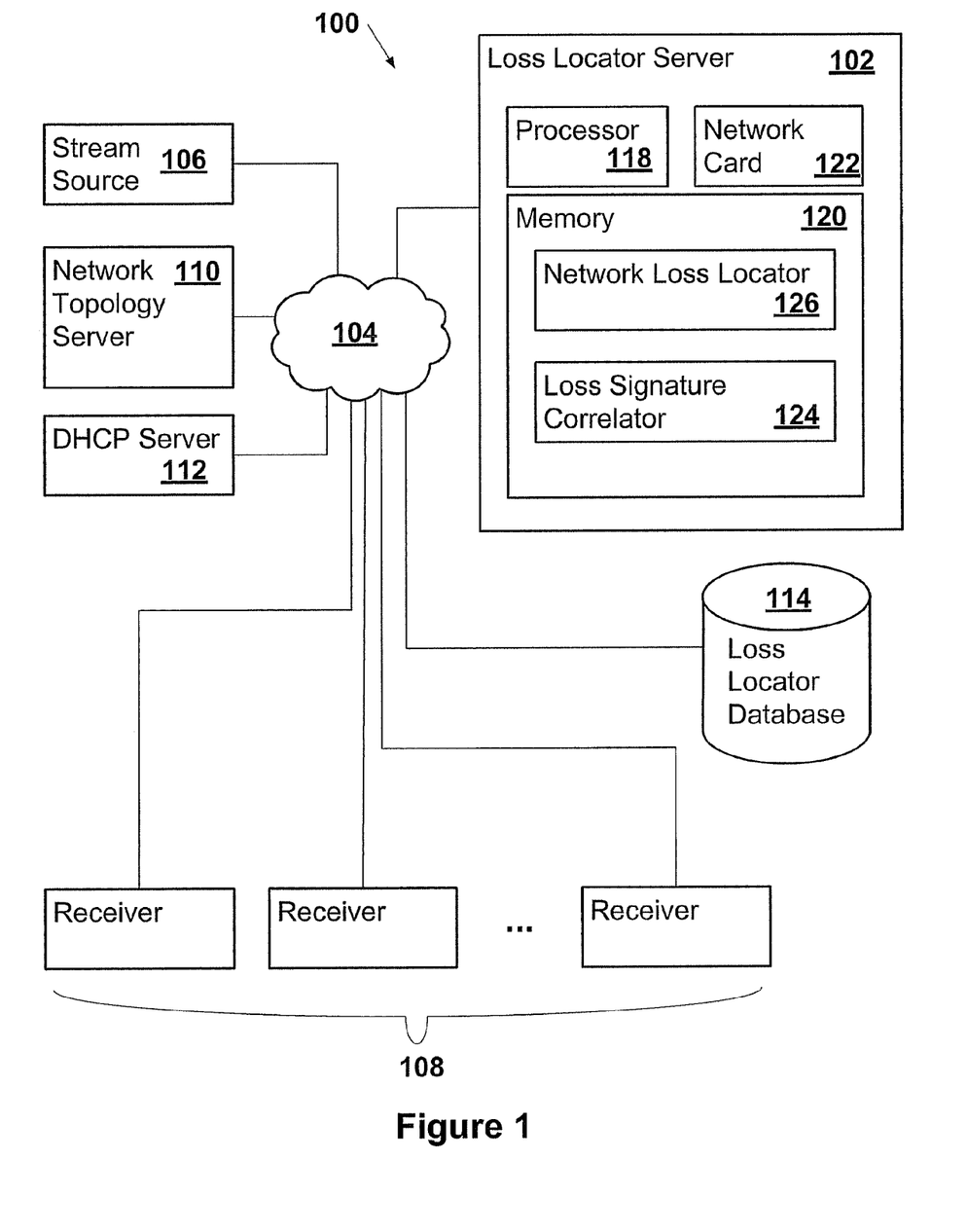
FIG. 1 illustrates one embodiment of a system to determine a packet loss location.

FIG. 1 illustrates one embodiment of a system 100 to determine a packet loss location. A packet loss location may be an identifier of a device or a combination of devices within a network that may cause a loss of one or more packets in a stream of packets. A packet is a formatted block of data for transmission over a communications network. The system 100 may include a Loss Locator Server 102, a network 104, a Stream Source 106, Receivers 108, a Network Topology Server 110, a Dynamic Host Configuration Protocol (DHCP) Server 112, and a Loss Locator Database 114. In different examples, the system 100 may include fewer, more, or different components. For example, the system 100 may only include the Loss Locator Server 102, where the Loss Locator Server 102 includes the Loss Locator Database 114. Alternatively, the system 100 may include the Loss Locator Server 102, the network 104, and the Loss Locator Database 114. In one example, the system 100 may additionally include a fault management system. Each of the Loss Locator Server 102, the Stream Source 106, the Receivers 108, the Network Topology Server 110, the Dynamic Host Configuration Protocol (DHCP) Server 112, and the Loss Locator Database 114 may be in communication with the network 104.

The Loss Locator Server 102 may be any device or combination of devices that determines a packet loss location. A packet loss location may include an IP address or any identifier suitable to identify a source of a determined packet loss. Examples of a Loss Locator Server 102 may include a computer, a server, a cluster of servers, and an application specific integrated circuit (ASIC).

The Stream Source 106 may be any device or combination of devices that may transmit a stream of packets over the network 104 to one or more Receivers 108. Examples of the Stream Source 106 include a video encoder, a video multiplexer, a router, a gateway, a computer, a server, a cluster of servers, and/or an application specific integrated circuit (ASIC). The stream of packets (packet stream) may be formatted in conformance with any stream protocol. Examples of a stream protocol may include Real-time Transport Protocol (RTP), Packetized Elementary Stream (PES), IPTV, Voice over IP (VoIP), and Trivial File Transfer Protocol (TFTP). The packets included in the packet stream may be transmitted to multiple Receivers 108 using, for example, multicast and/or broadcast methods.

Each of the Receivers 108 may be any device or combination of devices that may receive a stream of packets and decode a media stream from the stream of packets. Examples of Receivers 108 include Set Top Boxes, computers, Personal Digital Assistants, VoIP phones, and/or digital tuners.

The network 104 may be a Local Area Network (LAN), a Wireless Local Area Network (WLAN), a Personal Area Network (PAN), a Wide Area Network (WAN), any other now know or later developed communications network, or any combination thereof. The network 104 may include one or more logical networks, such as a logical network that includes paths taken by packets transmitted from the Stream Source 106 to the Receivers 108. The logical networks may further include control networks that include paths taken by packets used to carry control and/or reporting information.

Broadcast may be a network addressing method based on Request for Comments (RFC) 919 that uses a broadcast address. The broadcast address is an IP address that enables broadcasted packets to be transmitted to all machines on a subnet included in the network 104 rather than to a subset of machines on the subnet.

Multicast may be a network addressing method to transmit packets to a group of Receivers 108 at substantially the same time, where the packets may be transmitted once over each of the links included in the logical network, and the packets may be duplicated when paths to one or more of the Receivers 108 diverge. For example, the paths may diverge at a router included in the logical network. Multicast may apply to IP multicast or to any other data link layer one-to-many distribution mechanisms such as Ethernet multicast addressing, Asynchronous Transfer Mode (ATM) point-to-multipoint Video Codec (VC)s, and Multi Protocol Label Switching (MPLS) multicast.

The Network Topology Server 110 may be any device or combination of devices that may determine a network topology of all or a portion of the network 104. In particular, Network Topology Server 110 may determine a network topology tree. The network topology tree may be of a logical network included in the network 104 over which the stream of packets is transmitted from the Stream Source 106 to the Receivers 108. A network topology may be the arrangement or mapping of network elements, such as network nodes and links. A network node may be any device or combination of devices that transmits packets, receives packets, or both. Examples of network nodes include computers, personal digital assistants (PDAs), cell phones, Digital Subscriber Line Access Multiplexers (DSLAMs), switches, and routers. Links are connections between the network nodes used to transport data. A connection may be electrical, optical, wireless, or any other now known or later developed data connection.

The Network Topology Server 110 may determine the network topology tree in different ways. For example, the Network Topology Server 110 may determine the network topology tree based on knowledge of a physical network topology in combination with an execution of multicast Physical Topology Management Information Base (MIB) get functions. In an alternative example, the Network Topology Server 110 may determine the logical network by invoking a multicast trace function on one or more routers included in the network 104.

For example, when IP multicast is used, routers in the logic network 104 may create optimal distribution paths for packets sent to a multicast destination address. The multicast destination address may correspond to an IP multicast group. Receivers 108 may selectively join the IP multicast group. The routers may create a multicast tree for that group. The nodes in the multicast tree may efficiently minimize packet replication as the packets travel to the Receivers. The protocol most widely used for IP multicast is Protocol Independent Multicast (PIM). PIM has multiple flavors, such as Sparse Mode (SM), Dense Mode (DM), Source Specific Mode (SSM), and Bidirectional Mode (Bidir).

The Internet Group Management Protocol (IGMP) is a communications protocol used to manage the membership of IP multicast groups over layer two Ethernet networks. IGMP may be used by network nodes and neighboring network nodes to establish multicast group memberships. Through the IGMP protocol, the network node may initiate a report to an adjacent router, where the report requests membership in the multicast group. The adjacent router may, if it is not currently receiving that multicast group, initiate a PIM join. The adjacent router may listen for reports from the network node and may periodically transmit queries to the network node to determine if the network node intends to remain a member of the multicast group.

The Network Topology Server 110 may include one or more devices that determine the network topology from a Physical Topology Management Information Base (MIB) compliant data as described in Request for Comments (RFC) 2922. For example, some devices from Cisco®, a registered trademark owned by Cisco Technology, Inc. of San Jose, Calif., can support the Simple Network Management Protocol (SNMP) to access and collect information about network device status and performance and to support queries using MIB modules.

In examples using Multicast Routing (Mroute), the following MIBs contain information derived from IP Multicast tables in a router: (1) IPMROUTE-MIB.my, (2) IPMROUTE-STD-MIB.my, and (3) CISCO-IPMROUTE-MIB.my. These enumerated MIBs may contain, for each multicast group traversing the router, information about IP multicast groups. This information includes details of ingress and egress interface(s) that a multicast flow uses, as well as the IP address of an upstream neighboring router.

The Network Topology Server 110 may collect MIB information from routers in the network 104, and, for each multicast group, determine the path taken by the multicast packets transmitted through the network 104. From such data, the Network Topology Server 110 may determine a multicast tree that is the logical network. For each multicast group, the multicast tree may be different. For example, one Stream Source 106 may be connected to a different network router than another Stream Source 106 and/or the Receivers 108 may join different multicast groups.

The DHCP Server 112 may be one or more devices that manage a pool of IP addresses and information about client configuration parameters such as a default gateway, a domain name, a Domain Name System (DNS) server, a time server, information about any other type of server, or any combination thereof. In one example, the network 104 may include one or more DHCP Servers 112.

The Loss Locator Database 114 may be any database used by the Loss Locator Server 102 to store and retrieve information. A database may include a memory, with any electronic collection of information stored therein. The information may be organized so that the information may be accessed, managed, and updated. Examples of a database include but are not limited to a Relational Database Management System (RDBMS), an object-oriented database, an extensible markup language (XML) database, a file system, memory structures, or other now known or later developed data organization and storage mechanism. The database may use any type of memory and structure, such as a random access memory (RAM), a read-only memory (ROM), an erasable programmable read-only memory (EPROM), flash memory, optical memory, magnetic (hard-drive or tape) memory or other memory device.

The database may include database entries. A database entry is information that may be retrieved from or stored in the database. The database entry may be accessed or looked-up using a unique key, such as a primary key value, a full path name, or a memory address. For example, the database entry may be a row in a table in an RDBMS. In other examples, the database entry may be stored across multiple locations in the database, such as across multiple tables in an RDBMS. A table in an RDBMS may include one or more columns. The database may include a collection of databases.

The Loss Locator Server 102 may include a processor 118, a memory 120, and one or more network cards 122. In different examples, the Loss Locator Server 102 may include fewer, more, or different components. For example the Loss Locator Server 102 may include the Loss Locator Database 114.

The memory 120 may be any now known, or later discovered, data storage device. The memory 120 may be a non-volatile and/or volatile memory, such as a random access memory (RAM), a read-only memory (ROM), an erasable programmable read-only memory (EPROM), or flash memory. The memory 120 may include an optical, magnetic (hard-drive) or any other form of data storage device.

The processor 118 may be in communication with the memory 120. The processor 118 may also be in communication with additional components, such as the one or more network cards 122 and a display. The processor 118 may be a general processor, central processing unit, server, application specific integrated circuit (ASIC), digital signal processor, field programmable gate array (FPGA), digital circuit, analog circuit, or any combinations thereof.

The processor 118 may be one or more devices operable to execute computer executable instructions. The memory 120 may include computer code that includes the instructions executable with the processor. The computer code may include logic embedded in the instructions. The computer code may be written in any computer language now known or later discovered, such as C++, C#, Java, Pascal, Visual Basic, Perl, HyperText Markup Language (HTML), JavaScript, assembly language, and any combination thereof. The computer code together with the processor 118 may carry out the functionality of the Loss Locator Server 102.

The computer code may include code modules. For example, the memory 120 may include code modules such as a Loss Signature Correlator 124 and a Network Loss Locator 126. In a different example, the computer code may include more, less, or different code modules.

During operation, the Stream Source 106 may transmit a packet stream over the network 104 to the Receivers 108. The packet stream may be retransmitted by network nodes included in the network 104 in order for packets in the packet stream to travel from the Stream Source 106 to the Receivers 108. One or more of the Receivers 108 may fail to receive one or more packets. The Receivers 108 that fail to receive the packets may identify the packets within the packet stream that are not received. Any two or more Receivers 108 that fail to receive the same packet or packets may share a common network node in the network 104 that is a source of the packet loss.

The Receivers 108 failing to receive a packet or packets may transmit a loss signature to the Loss Locator Server 102. A loss signature identifies one or more packets within a packet stream that was not received by a Receiver 108.

A Receiver 108 may generate the loss signature in a number of ways. The loss signature may identify the packet or packets within the packet stream that the Receiver 108 failed to receive. Thus, the loss signature may uniquely identify a packet loss event. For example, if two Receivers 108 generate the same loss description, the loss descriptions should refer to the same loss event. Hence, the loss description is called a loss signature.

The Receiver 108 may derive the loss signature from headers of packets in a packet stream, where the headers include sequence numbers. In one example, the packet stream may be encapsulated in transport stream packets. The transport stream packets may not include sequence numbers, but the headers of the encapsulated packets may.

For example, transport stream packets may be IP packets and the encapsulated packets may be a Packetized Elementary Stream (PES). The packet headers of packets in the PES may include a sequence number.

In a different example, the packet stream may conform to the Real-time Transport Protocol (RTP). In one such example, an MPEG-2 Transport Stream (TS) may be encapsulated in RTP packets, which are in turn encapsulated in User Datagram Protocol (UDP) packets. UDP packets are one type of IP packets.

A sequence number may be considered unique within a limited time period. For example, in RTP, the sequence number is 16 bits long. A standard definition MPEG-2 video stream may be transmitted at around 300 IP packets per second. Therefore, the 16-bit sequence number may wrap in approximately 3 minutes. In the case of high definition video, the sequence number may wrap in approximately 1 minute.

Where the packet stream is RTP, the Receiver 108 may derive the loss signature from a sequence number in an RTP packet header. The Receiver 108 may identify a packet loss when a packet is received with a non-sequential sequence number. A loss event in the network may cause one or more packets to be lost. A noise induced loss may result in multiple packets being lost but not necessarily successive packets. The Receiver 108 may generate the Loss Signature as a concatenation of each of the sequence numbers corresponding to packets not received among a group of packets. For example, where packets numbered with sequence numbers 11 through 16 were to be received and packets numbered 12, 14, and 15 were not received, the loss signature may be "12, 14, 15." Alternatively, separate loss signatures are created for "12," "14," and "15."

Using the RTP protocol, the Receiver 108 may report a packet loss by transmitting an Real-time Transport Control Protocol (RTCP) Negative Acknowledgement (NACK) packet. A NACK packet includes a Packet Identifier (PID) field and a bit mask (BLP) field. The PID refers to the sequence number of the first lost packet in the sequence. The BLP field identifies the subsequently lost packets. Therefore, a combination of the PID and BLP field may be the loss signature. RTCP NACK reports may be transmitted immediately after the receiver detects the loss event.

Using the RTP protocol, the Receiver 108 may, alternatively or additionally, report a packet loss by using the RTCP Extended Report (XR) RLE Report Block. The RTCP XR RLE Report Block may be described by RFC 3611 or a later standard. The Receiver 108 may periodically transmit the RLE Report Block. The period of transmission of the RLE Report Block may be, for example, every 30 seconds. The report may identify the specific packets lost over the reporting interval using RTP sequence numbers. The loss signature may be derived from these RTCP report packets. Additionally or alternatively, the RTCP report packets may be used to transmit positive messages (no loss reported) and negative messages (loss signatures). NACK reports contain negative messages. Other reporting formats and/or packets may be used for reporting negative messages and positive message.

Where MPEG-2 TS is used, the Receiver 108 may generate the loss signature from packet headers included in the MPEG-2 TS. The MPEG-2 TS may be encapsulated in UDP packets. There may be multiple (e.g. seven) MPEG-2 TS packets included in each UDP packet. An MPEG-2 TS packet includes a payload and a header. The header includes a Packet Identifier (PID) field and a Continuity Counter field.

The PID is a 13-bit identifier used to uniquely identify the packet stream to which the packet belongs. Some PID values are predefined and are used to indicate various streams of control information. A packet with an unknown PID, or one with a PID which is not required by the Receiver 108, may be discarded. The PID value of 0x1FFF is reserved to indicate that the packet is a null packet that is to be ignored by the Receiver 108.

The Continuity Counter may be 4-bits. To decode the contents of the packet stream, the Receiver 108 may check the MPEG-2 Continuity Counter (CC) included in the TS Packet header. Assume for example that the Receiver 108 receives two successive TS packets with the same PID. If the Continuity Counter value in the second packet is not identical to that in the first packet and does not increment the Continuity Counter value in the first packet by one (modulo 16), then the Receiver 108 has detected a continuity error.

The Receiver 108 may generate a loss signature based on a continuity error. If the Receiver 108 receives a first UDP packet followed by a second UDP packet and detects a continuity error in an MPEG-2 TS packet in the second UDP packet, a UDP packet loss has occurred. Because a UDP packet may encapsulate TS packets that belong to more than one stream, the first and last TS packet in the UDP packet may have different PID values. In one example, the Receiver 108 may combine the PID and CC values of the last TS packet of the first UDP packet in order to generate an identifier of the first UDP packet. The Receiver 108 may combine the PID and CC values of the first TS packet of the second UDP packet in order to generate an identifier of the second UDP packet. The Receiver 108 may generate the loss signature as a combination of the identifier of the first UDP packet and the identifier of the second UDP packet.

For example, assume that the last TS packet encapsulated in the first UDP packet has a (PID, CC) pair of (51, 9) and that the first TS packet encapsulated in the second UDP packet has a (PID, CC) pair of (64, 12). The loss signature may be a combination thereof, which is (51, 9, 64, 12).

In other examples, the loss signature may be a combination of the (PID, CC) pair in the first TS packets of both the first and second UDP packets. In still other examples, the loss signature may be a combination of the (PID, CC) pair in the last TS packets of both the first and second UDP packets.

In an alternative example, the Receiver 108 may generate the loss signature as a single (PID, CC) pair. For example, the loss signature may be (PID, CC) pair of the CC from which the Receiver 108 detected a continuity error.

In practice, a continuity counter value may be reused over time because the continuity counter is incremented modulo 16. However, during a time period over which the continuity counter value is not recycled, the (PID, CC) pair may uniquely identify the packet loss. Where the network 104 experiences very low packet loss, the (PID, CC) pair has a high probability of uniquely identifying the packet loss over an even longer period of time. Furthermore, where the loss signature includes the combination of (PID,CC) pairs, then the loss signature has an even higher probability of uniquely identifying the packet loss over extend periods of time.

The Receiver 108 may transmit the loss signature and/or any positive message indicating receipt of an identified packet to the Loss Locator Server 102 directly or indirectly. For example, each of the Receivers 108 may be configured to transmit the RTCP NACK packet and/or RTCP XR RLE Report Block to a "feedback target." The feedback target may be the Stream Source 106 in one example. In a different example, the feedback target may be the Loss Locator Server 102. When the feedback target is different from the Loss Locator Server 102, the feedback target may relay information received from the Receivers to the Loss Locator Server 102.

In examples where RTP is not used by the Stream Source 106, the Receivers may use another suitable protocol to report positive and/or negative messages. One or more of the Receivers 108 may be configured to transmit the loss signatures and/or positive messages to the Loss Locator Server 102 or some other feedback target. In one example, the protocol used for reporting may be a proprietary protocol developed specifically for reporting information about lost and/or successfully received packets. The proprietary protocol may, for example, be encapsulated in UDP packets. The Loss Locator Server 102 or some other device or devices may configure the feedback target identified in the Receivers 108.

The Loss Locator Server 102 may receive loss signatures from the Receivers 108. The Loss Signature Correlator 124 may determine which of the Receivers 108 failed to receive the same identified packets. The Receivers 108 that failed to receive the same identified packets are the affected Receivers 108.

If two or more of the Receivers 108 failed to receive the same packet or packets, the Network Loss Locator 126 may determine the source of the packet loss. For example, the Network Loss Locator 126 may determine the packet loss location by finding a common ancestor node of the affected Receivers 108. The Network Loss Locator 126 may determine a network address for each of the affected Receivers 108. The Network Loss Locator 126 may obtain a network topology tree from the Network Topology Server 110 using network addresses of the affected Receivers 108 and a network address of the Stream Source 106. The network topology tree may be the logical network included in the network 104 over which the stream of packets is transmitted from the Stream Source 106 to the Receivers 108. The Network Topology Server 110 may determine the network topology tree for the portion of the network 104 between the Stream Source 106 and the affected Receivers 108. One of the Receivers 108 failing to receive a packet may indicate a source of error as well.

In different examples, loss signatures may be received by one of the network nodes in the network 104 or by some other device that is in communication with the network 104, such as the Stream Source 106. In such examples, the Loss Signature Server 102 may receive the loss signatures from the network node in the network 104 or from the device that is in communication with the network.

Figure 2:
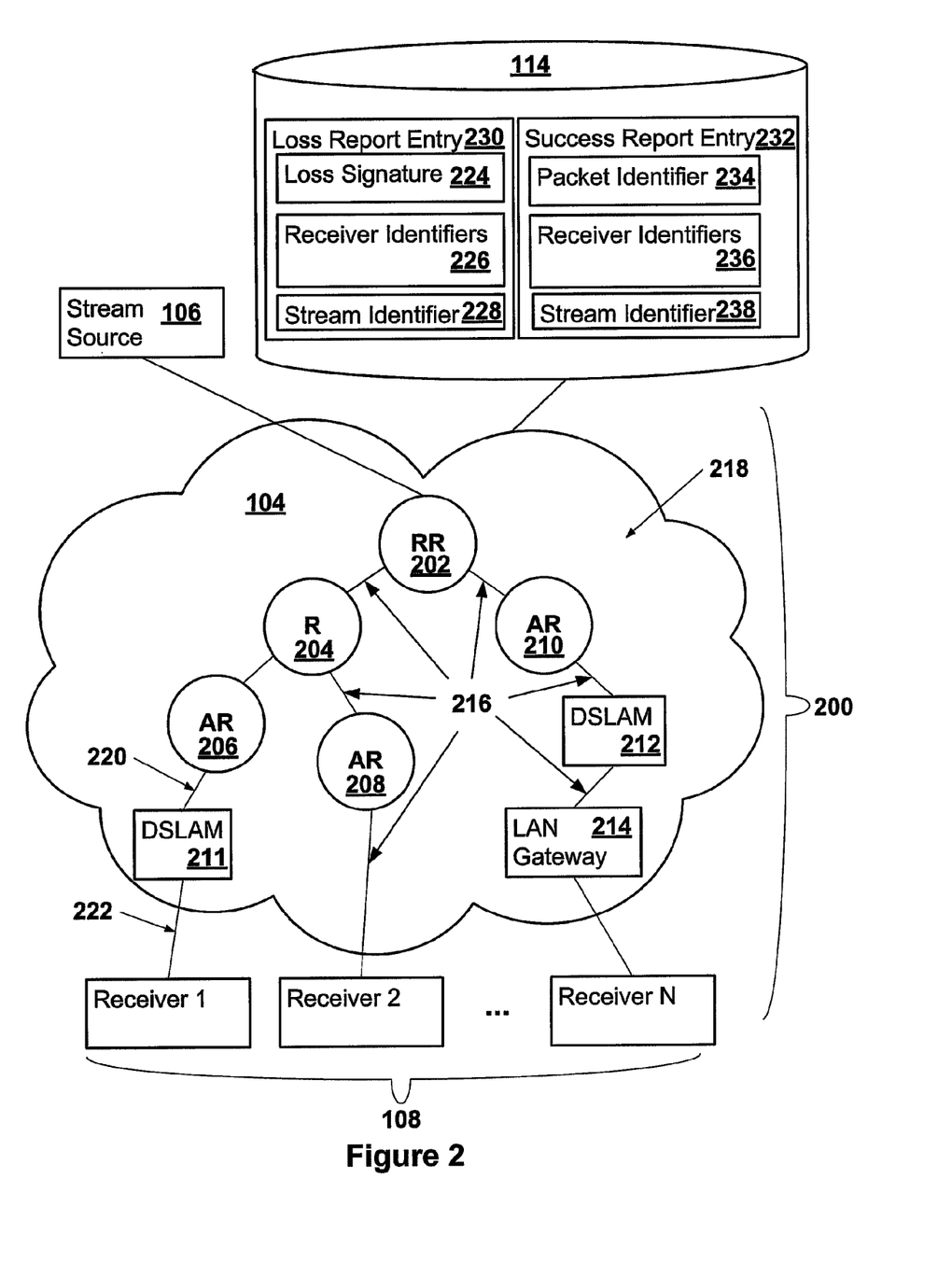
FIG. 2 illustrates a network in a system to determine a packet loss location.

FIG. 2 illustrates a network 104 in a system 100 to determine a packet loss location. The network 104 may include network nodes 200. Each of the network nodes 200 may be in communication with at least one other network node 200. Communication between any two network nodes 200 may be over one of the links 216 in the network 104.

The network nodes 200 in the network topology tree 218 may be arranged in a hierarchy. The network nodes 200 in the network topology tree 218 may include the Receivers 108 and a root router 202 with which the stream source 106 communicates. The network nodes 200 in the network topology tree 218 may also include additional routers 204, 206, 208, 210, and 214, where the additional routers are included on at least one of the paths to one or more of the Receivers 108. For example, the additional routers 204, 206, 208, 210, and 214 may include access routers 206, 208, and 210. An access router 206, 208, or 210 may be a router that is a provider edge device.

A provider edge device provides an entry point into a WAN or a Metropolitan Area Network (MAN) managed by a service provider. Examples of a provider edge device include switches, routers, integrated access devices (IADs) and multiplexers. In one example, one of the links 216 may directly connect an access router 206, 208, and 210 to one of the Receivers 108. In a different example, a first link 220 may connect the access router 206, 208, and 210 to a DSLAM 211 and 212 and a second link 222 may connect the DSLAM 211 and 212 to one of the Receivers 108. In yet another example, the LAN Gateway 214 may be between the DSLAM 211 and 212 and one of the Receivers 108. A LAN Gateway 214 is a router in a LAN that is assigned a network address by the DHCP Server 112 or otherwise assigned by a provider of the network 104.

During operation, packets transmitted by the Stream Source 106 may follow a path through the network topology tree 218 that depends on which of the Receivers 108 is to receive the packets. Therefore, one path may include network nodes 208 that another path does not. Conversely, the paths to two or more of the Receivers 108 may include network nodes 208 that are common to the paths.

If one of the Receivers 108 fails to receive a packet or packets, the Receiver 108 may generate a Loss Report. The Loss Report may include the Loss Signature 224 discussed above that identifies the packet or packets within the packet stream that the Receiver 108 failed to receive. The Loss Report may also include a Receiver Identifier 226 and a Stream Identifier 228. In other examples, the Loss Report may include more, fewer, or different information. For example, the Loss Signature 224 may include the Stream Identifier 228 and the Receiver Identifier 226. To transmit the Loss Signature 224 to the Loss Locator Server 102, the Receiver 108 may transmit the Loss Report.

A Stream Identifier 228 may identify one packet stream from other packet streams. A Stream Identifier 228 may be used when multiple packet streams are transmitted to the Receivers 108. For example, if the packet streams are transmitted via IP multicast, the Stream Identifier 228 may correspond to an IP multicast group address. An IP multicast group address is used by sources and receivers to send and receive content. Sources use the group address as an IP destination address in data packets transmitted by the sources. Receivers use the group address to inform the network that of an interest in receiving packets sent to that group.

A Receiver Identifier 226 identifies the Receiver 108 that failed to receive the packet or packets. For example, the Receiver Identifier 226 may be a network address (such as an IP address), a Media Access Control (MAC) address, a serial number of a set top box, or any other identifier that distinguishes one of the Receivers 108 from another. Furthermore, the Receiver Identifier 226 may be an identifier from which a network address may be determined, where the Network Topology Server 110 may use the network address to identify a network node 200 corresponding to the Receiver Identifier 226.

In one example, if the Receiver 108 is one of the Access Routers 206, 208, or 210 or some other network node 200 between an Access Router 206, 208, or 210 and the Stream Source 106, then the Receiver Identifier 226 may be an IP address from which the Network Topology Server 110 may identify a corresponding network node 200. The Receiver 108 in such an example may have child network nodes 200 that are included in the network topology tree 218, such as other Receivers 108, DSLAMs 211 and 212, and/or LAN Gateways 214.

In other examples, the network topology tree 218 received from the Network Topology Server 110 may be incomplete. For example, the portion of the multicast tree that the Network Topology Server 110 may be able to construct may only include the network nodes 200 in the network topology tree 218 from the Stream Source 218 down to the last Access Router 206, 208, and 210.

For example, the DSLAM 211 and 212 may use IGMP snooping. IGMP snooping is a process of listening to IGMP traffic. IGMP snooping enables a level two switch such as the DSLAM 211 and 212 to "listen in" on an IGMP conversation between the Receiver 108 and the Access Router 206, 208, and 210 processing the layer three IGMP packets. When the DSLAM 211 and 212 hears the IGMP report from the receiver 108 requesting the multicast group, the DSLAM 211 and 212 may add a port number of the Receiver 108 to a multicast list for that group. If the DSLAM 211 and 212 is not currently receiving the multicast group, the IGMP report may be forwarded to the Access Router 206, 208, and 210. The Access Router 206, 208, and 210 may add the port number to a multicast list of the Access Router 206, 208, and 210, and may forward the multicast group to the DSLAM 211 and 212. If the DSLAM 211 and 212 is already receiving that multicast group from the Access Router 206, 208, and 210, the DSLAM 211 and 212 may simply add the port number to the multicast group list of the DSLAM 211 and 212. Thus, the Access Router 206, 208, and 210 may avoid sending the same multicast group to the DSLAM 211 and 212 for each of the Receivers 108 that requested membership in the multicast group. As a result, bandwidth between DSLAM 211 and 212 and the Access Router 206, 208, and 210 is saved and the DSLAM 211 and 212 becomes a possible packet loss source. However, the DSLAM 211 and 212 and/or the Receivers 108 may not be included in the network topology tree 218 returned by the Network Topology Server 110.

Nevertheless, the network topology tree 218 may be completed by associating the Receiver 108 with the Access Router 206, 208, and 210. For example, the DHCP Server 112 may assign a network address to one or more of the Receivers 108 in communication with the DSLAM 211 and 212. For example, one of the Receivers 108 may be configured to use the DHCP Server 112 to assign a network address to the Receiver 108 that is in communication with the Access Router 206, 208, and 210. When the Receiver 108 requests an IP address, the DHCP Server 112 may receive one or more device identifiers, such as MAC addresses, that identify the Receiver 108, the DSLAM 211 and 212, and/or the Access Router 206, 208, and 210. Based on the Receiver Identifier 226, the Loss Locator Server 102 may query the DHCP Server 112 to get one or more of the device identifiers used when obtaining the IP address of the Receiver 108.

Alternatively or additionally, the Loss Locator Server 102 may query the DHCP Server 112 to obtain the network addresses corresponding to the device identifiers. Moreover, the Network Topology Server 110 and/or the Loss Locator Server 102 may use network addresses and/or device identifiers returned by the DHCP Server 112 in order to add the Receiver 108 and the DSLAM 211 and 212 to the network topology tree 218.

In a different example, the LAN Gateway 214 may logically divide the topology tree into one portion on one side of the LAN Gateway 214 and a LAN on the other side of the LAN Gateway 214. The LAN Gateway 214 may perform Network Address Translation (NAT). With NAT, the address space within the LAN may be different from the address space in the portion of the Network 104 from which the Network Topology Server 110 may be able to generate a network topology tree 218. The DHCP Server 112 may not be able to identify the Receiver 108 based on a network address that is in the address space of the LAN. In such a case, the Receiver Identifier 226 may be a network address or a device identifier of the LAN Gateway 214. Additionally, the Receiver Identifier 226 may include both an identifier of the LAN Gateway 214 and an identifier of the Receiver 226.

The Loss Signature Correlator 124 may use Loss Report Entries 230 stored in the Loss Locator Database 114 to determine which identified packet losses are correlated. One identified packet loss is correlated with another when both packet losses are losses of the same packet or packets in a packet stream. In one example, the Loss Report Entry 230 may include the same information that the Lost Report includes, such as the Loss Signature 224, the Receiver Identifier 226, and/or the Stream Identifier 228. In other examples, the Loss Report Entry 230 may include more, less, or different information such as a timer value (not shown) that indicates a time first received.

When the Loss Signature Correlator 124 receives a Lost Report, the Loss Signature Correlator 124 may store the information included in the Lost Report in a Loss Report Entry 230. The Loss Signature Correlator 124 may also set the timer value in the Loss Report Entry 230 to the current time. If a Loss Signature 224 and a Stream Identifier 228 included in the received Lost Report match a Loss Signature 224 or portion of a Loss Signature 224 and a Stream Identifier 228 included in an existing Loss Report Entry 230, then the existing Loss Report Entry 230 may be updated to additionally include a Receiver Identifier 226 that was included in the newly received Lost Report.

Periodically, the Loss Signature Correlator 124 may retrieve correlated Loss Report Entries 230 from the Loss Locator Database 114, where each of the correlated Loss Report Entries 230 includes two or more Receiver Identifiers 226. The Receiver Identifiers 226 included in a correlated Loss Report Entry 230 identify the Receivers 108 affected by the lost packets that are identified by the Loss Signature 224 in the correlated Loss Report Entry 230. For each of the correlated Loss Report Entries 230, the Loss Signature Correlator 124 may request the Network Loss Locator 126 to determine a corresponding packet loss location of the packet or packets that the affected Receivers 108 failed to receive.

The Loss Report Entries 230 that include only one Receiver Identifier 226 may be discarded or used for some other purpose. In a reliable Network 104 that rarely loses packets, the source of a majority of packet loses may be in the link 222 between a DSLAM and one of the Receivers 108. Other Receivers 108 are not likely to experience the same identified packet loss. However, if another Receiver 108 did experience the same identified packet loss, then the packet loss source may likely be a common ancestor node of the affected Receivers 108.

The period at which the Loss Signature Correlator 124 checks for correlated Loss Report Entries 230 may be a determined time period. The determined time period may be less than the period of time during which the Loss Signature 224 may uniquely identify the one or more packets within a packet stream. In one example, the Loss Signature Correlator 124 may delete the Loss Report Entries 230 after identifying the correlated Loss Report Entries 230. In another example, the Loss Signature Correlator 124 may periodically delete the Loss Report Entries 230 using a period longer than the determined time period. In still another example, the Loss Report Entries 230 may not be deleted.

In one example, the timer value may start when the Loss Signature Correlator 124 receives a first instance of the Loss Signature 224. The Loss Signature Correlator 124 may continue looking for the Loss Signature 224 until the time expires after the determined period of time.

The example embodiments given above to determine correlated Loss Reports and to determine the corresponding affected Receivers 108 are merely illustrative. A different suitable method to match the Loss Signature 224 and the Stream Identifier 228 received from different Receivers 108 may be used. For example, instead of updating an existing Loss Report Entry 230 when a match is found, a new Loss Report Entry 230 may be created in the Loss Locator Database 114. After the determined period, the Loss Signature Correlator 124 may then retrieve Loss Report Entries 230 to determine which are correlated.

In one example, the Loss Signature 224 in the Loss Report Entry 230 may be stored in a format different than the format of the Loss Signature 224 received from the Receivers 108. For example, the Loss Signature Correlator 124 may compute a hash value from the Loss Signature 224 received from the Receivers 108. A hash function may be a well-defined procedure or mathematical function for turning some kind of data into a relatively small integer that may serve as an index. The values returned by a hash function are called hash values, hash codes, hash sums, or simply hashes.

For each of the correlated Loss Report Entries 230, the Network Loss Locator 126 may determine a corresponding packet loss source that caused the affected Receivers 108 to fail to receive the packet or packets. As described in more detail later, the Network Loss Locator 126 may determine the packet loss source to be a common ancestor node of the affected Receivers 108. Alternatively or in addition, the Network Loss Locator 126 may determine a packet loss source differently based on knowledge of which of the Receivers 108 successfully received packets that other Receivers 108 failed to receive. Thus, the Loss Signature Correlator 124 may keep track of which of the Receivers 108 received one or more of the packets identified within the packet stream by the Loss Signature 224. The Receivers 108 failing to receive the packet or packets are affected Receivers 108 and the Receivers 108 receiving the packet or packets are unaffected Receivers 108.

A Loss Signature Correlator 124 may determine that the Receiver 108 is an unaffected Receiver 108 if: (1) the Receiver 108 receives the packet in the packet stream; and (2) some other Receiver 108 fails to receive the packet. In one example, the Loss Signature Correlator 124 may receive a report from a Receiver 108, where the report indicates which packets in a packet stream were received and lost. An example of such a report is a Real-time Transport Control Protocol (RTCP) Extended Report (XR) RLE Report Block. In a different example, the Loss Signature Correlator 124 may have knowledge that a Receiver 108 receives the packet stream. Thus, if the Loss Signature Correlator 124 fails to receive a Loss Signature 224 from the Receiver 108, then the Loss Signature Correlator 124 may determine that the Receiver 108 is an unaffected Receiver 108.

In one example, the Loss Signature Correlator 124 may store in one or more Success Report Entries 232 information included in a report that indicates which packets in a packet stream were received. A Success Report Entry 232 may include a Packet Identifier 234, a Receiver Identifier 236, and a Stream Identifier 238. The Packet Identifier 234 may identify, within a packet stream, one or more packets successfully received by a Receiver 108, where the Receiver 108 is identified by the Receiver Identifier 236 and the packet stream is identified by the Stream Identifier 238. One or more of the Receivers 108 may periodically transmit the report to the Loss Locator Server 102 or to another device in communication with the Loss Locator Server 102.

The Loss Signature Correlator 124 may periodically retrieve the Success Report Entries 232 from the Loss Locator Database 114 in order to determine both affected Receivers 108 and unaffected Receivers 108. For each of the Loss Report Entries 230, the Loss Signature Correlator 124 may determine from the Success Report Entries 232 which Receivers 108 successfully received the packet or packets identified in the corresponding Loss Signature 224.

In one example, the Loss Signature Correlator 124 may generate the information described in Table 1 below.

TABLE 1

| Stream Identifier | Loss Signature | Affected Receiver Identifiers | Unaffected Receiver Identifiers | Timer Value |
|---|---|---|---|---|
| 28 | (51, 9, 64, 12) | 21, 6 | 45, 74 | 30 sec |
| 15 | (64, 8, 64, 10) | 3 | 12 | 25 sec |

The Network Loss Locator 126 may determine the packet loss location to be a common ancestor node of the affected Receivers 108 using a Lowest Common Ancestor (LCA) algorithm as applied to a network topology tree 218. The Network Loss Locator 126 may determine the network topology tree 218. In some examples, the Network Loss Locator 126 may convert one or more of the Receiver Identifiers 226 into a network address of a corresponding one of the affected Receivers 108 using the DHCP Server 112 as described above. In one example, the Network Loss Locator 126 may transmit a network address of the Stream Source 106 and network addresses of the affected Receivers 108 to the Network Topology Server 110. In response, the Network Topology Server 110 may return the network topology tree 218 that corresponds to the portion of the network 104 that includes the paths from the Stream Source 106 to the affected Receivers 108. In a different example, the Network Loss Locator 126 may request a network topology tree 218 of the whole of the network 104.

The packet loss source may be a common ancestor node of the affected Receivers 108. In particular, the packet loss source may be the lowest common ancestor node of the affected Receivers in a network topology tree 218.

Figure 3:
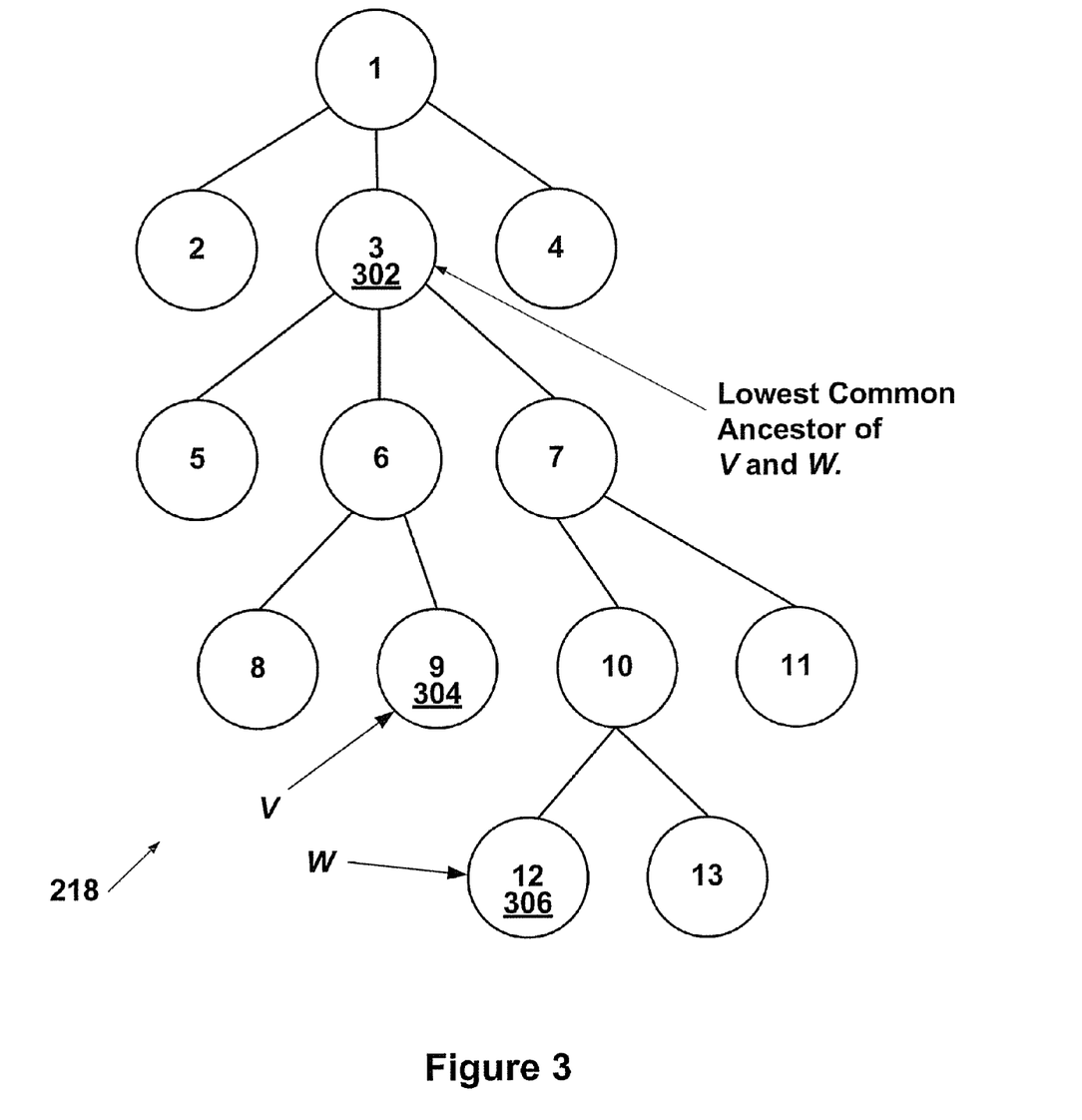
FIG. 3 illustrates an application of a Lowest Common Ancestor algorithm to an example of a network topology tree.

FIG. 3 illustrates an application of a Lowest Common Ancestor algorithm to an example of a network topology tree 218. The lowest common ancestor (LCA) algorithm, also called nearest common ancestor (NCA) algorithm, is a concept in graph theory and computer science. The network topology tree 218 may be a rooted tree with n nodes. The lowest common ancestor 302 between two nodes v 304 and w 306 is the lowest node in the network topology tree 218 that has both v 204 and w 306 as descendants. A node may be a descendant of itself. A first node separated from one of the two nodes v 304 and w 306 by fewer links than a second node is considered lower than the second node. For example, in FIG. 3, the lowest common ancestor node for node 9 and node 12 is node 3, where each of the nodes in the network topology tree 218 is denoted as node 1 to node 13 respectively.

Determining the LCA may be reduced to a problem of finding a minimum in a range of numbers. First, the nodes may be numbered using a breadth-first traverse. For example, each of the nodes may be numbered according to the depth of the node in the tree, numbering the root node as the lowest number. The nodes may be numbered level by level, increasing the numbers the further the levels are from the root node. Within the same level, the nodes may be numbered in one direction, such as from left to right. Second, the nodes of the tree may be traversed in an Euler tour to construct an array of the numbers corresponding to the nodes, in the order visited by the tour. Mathematically, an Euler tour of a connected, directed graph G=(V, E) is a cycle that traverses each edge of graph G exactly once, although the cycle may visit a vertex more than once. Thus, with respect to a tree, an Euler tour may start at the root of the tree, visit a child of the root of the tree, visit one of the children of the child, and so on until there are no more children. The tour may return to the parent of the childless node and visit the next child of the parent if one exists, continuing until a node without children is reached. The tour completes by repeating that procedure until all of the nodes in the tree are visited. If the nodes in the tree change, the breadth-first traverse and the Euler tour traversal may be repeated to reconstruct the array of the numbers corresponding to the nodes.

For example, the array of node numbers generated from an Euler tour of the network topology tree 218 in FIG. 3 is [1, 2, 1, 3, 5, 3, 6, 8, 6, 9, 6, 3, 7, 10, 12, 10, 13, 10, 7, 11, 7, 3, 1, 4, 1]. The LCA of any two nodes is simply the node with the least depth (i.e. lowest number) that lies between the two nodes in the Euler tour. Therefore, finding the LCA of a first node and second node in the tree may be determined by finding the minimum number in the array of numbers between the numbers corresponding to the first node and the second node. For example, the minimum number between 9 and 12 in the array of numbers generated from the Euler tour of the network topology tree 218 is 3. Therefore the lowest common ancestor node 302 of node 9 and node 12 is node 3.

The complexity associated with finding the minimum element is linear with time. To determine the LCA of more than two nodes, the above algorithms may be iteratively applied for different node pairs and then to the LCA(s) of the node pairs ancestor pairs. For example, consider an example where Node A, Node B, Node C, and Node D are affected Receivers 108. The LCA of Node A and Node B may be determined to be Node LCA1. The LCA of Node C and Node D may be determined to be Node LCA2. The LCA of the four nodes may be determined to be the LCA of Node LCA1 and Node LCA2.

Figure 4:
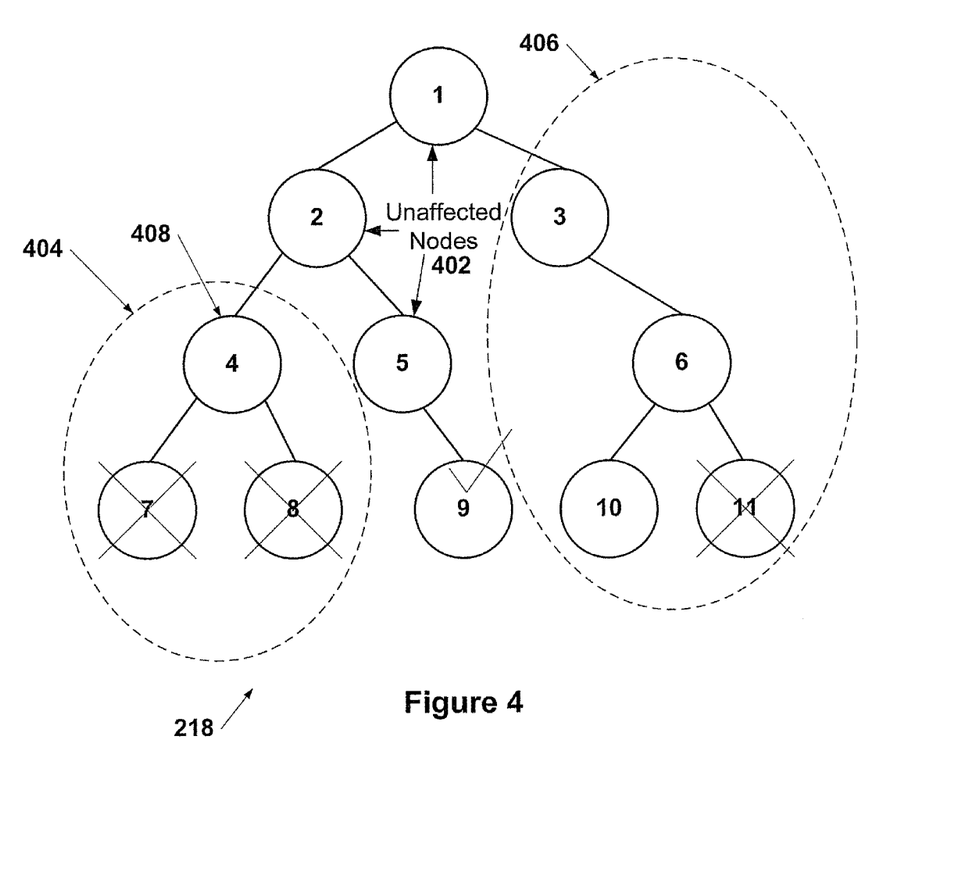
FIG. 4 illustrates an application of a modified Lowest Common Ancestor algorithm to an example of a network topology tree.

To increase the chance of correctly determining a packet loss source, the Network Loss Locator 126 may determine the packet loss source using a modified LCA algorithm that additionally utilizes the identifiers of both affected Receivers 108 and unaffected Receivers 108.

FIG. 4 illustrates an application of a modified Lowest Common Ancestor algorithm to an example of a network topology tree 218. Each of the network nodes 200 in the network topology tree 218 is denoted as Node 1 to Node 11 respectively. Node 7, Node 8, and Node 11 correspond to the affected Receivers 108. Node 9 corresponds to an unaffected Receiver 108.

The network nodes 200 on a path from the root of the network topology tree 218 to Node 9 include unaffected nodes 402. Because the packet or packets lost had successfully traveled the path to the unaffected Receiver 108, the unaffected nodes 402 may be eliminated from further consideration as a packet source loss. Removal of the unaffected nodes 402 from consideration may form subtrees 404 and 406 from the nodes 200 remaining in the network topology tree 218. Mathematically, a subtree is a tree G' whose graph vertices and graph edges form subsets of the graph vertices and graph edges of a given tree G. Each of the substrees 404 and 406 may be separately analyzed. If a subtree 404 or 406 includes just one affected Receiver 108, then the packet loss in that subtree 404 or 406 is considered uncorrelated and the subtree 404 or 406 does not include a packet loss source. If two or more affected Receivers 108 are included in the subtree 404 or 406, then a packet loss source 408 is the LCA of the affected Receivers 108 included in the subtree 404 or 406.

Thus, the network topology tree 218 may include more than one packet loss sources in one example, and no packet loss source in another example. In FIG. 4, Node 4 is the packet loss source for the packets that Node 7 and Node 8 failed to receive. Although Node 11 failed to receive the same packet or packets that Node 7 and Node 8 failed to receive, Node 11 is considered uncorrelated with respect to the subtree 404 or 406 because the subtree 404 or 406 does not include any other affected Receivers 108.

The packet loss sources identified by the Loss Locator Server 102 may be used by systems in any number of ways. The information generated by the Loss Locator Server 102 may include the location of a packet loss source that caused a packet loss event and an impact of the loss event.

The location of a packet loss source, together with the associated Stream Identifier 228 and the number of affected Receivers 108 may be used to generate a trap in a fault management system. The fault management system may, for example, display the event to a network operator via an alarm window. The event may also be stored in an event log (a database) where the information may available for long term analysis. An example analysis may include viewing all loss events on a particular interface of a router that occurred during a determined time period. The information may be displayed in the form of a report or a graphical display. Such a report facility may identify the router interfaces that are associated with the highest network losses. Alternatively or additionally, the operator may choose to run a report to view the performance over time for a specific multicast group carrying a specific TV program.

By maintaining a database containing the physical location (link, node, home, etc.) of the loss events, irrespective of the Stream Identifier 226, a report may be generated to determine the links or home networks that are more prone to errors. Such a report may, for example, identify the 100 most error prone customer sites or the 10 most error prone network links. The network operator then may take proactive actions to resolve a problem. Thresholds may be set based on the number of events observed over a determined period of time and an alarm generated in a network fault management system to inform a network operator that a specific link is a problem.

A system 100 may determine the number of Receivers 108 that have been affected by a particular event. Where hundreds of video channels are provided by a network operator, some channels may be more popular than others. The Loss Locator Server 102 may count the number of affected Receivers 108 for each of the Loss Report Entries 230 associated with a Stream Identifier 228. Thus, the system 100 may determine an impact on a particular television program that was transmitted over a packet stream identified by the Stream Identifier 228.

For each video program, the impact metric may be determined that is an aggregated number of Receivers 108 affected by the loss events that occurred during a determined period of time, such as over the last hour. The impact metric may provide a metric for both the quality of reception of a specific television program and an estimate of the number of viewers impacted by loss events.

Figure 5:
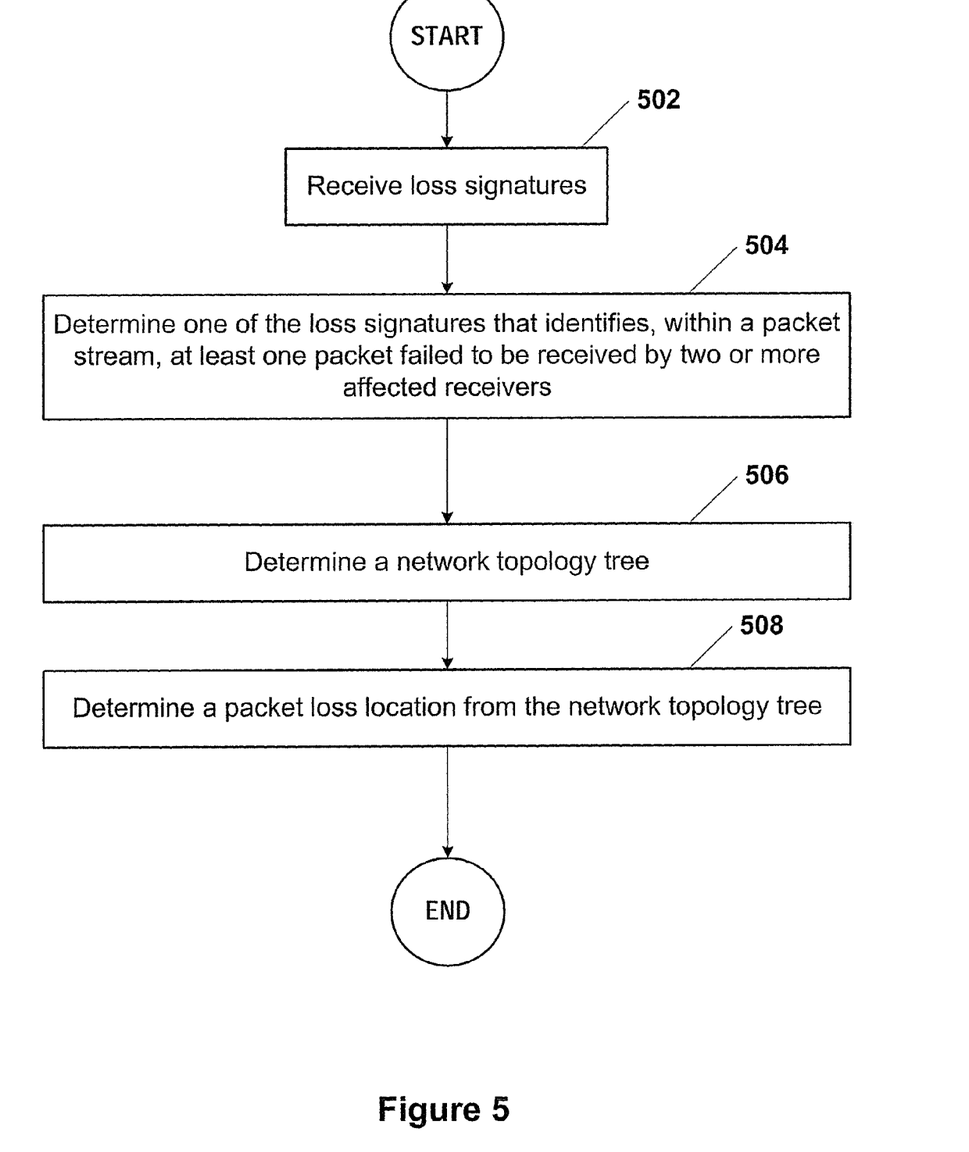
FIG. 5 illustrates one embodiment of a method to locate a source of a packet loss.

FIG. 5 illustrates one embodiment of a method to locate a source of a packet loss. Additional, different, or fewer acts may be performed. The acts may be performed in a different order than illustrated in FIG. 5.

In act 502, the operation may begin by receiving Loss Signatures 224. The operation may continue in act 504 by determining whether one of the Loss Signatures 224 identifies, within a packet stream, at least one packet that two or more affected Receivers 108 failed to receive.

In act 506, the operation may continue by determining a network topology tree 218. The network topology tree 218 may include multiple network nodes 200. The network nodes 200 may include a root node and multiple affected receiver nodes. The Stream Source 106 of the packet stream may correspond to the root node, and each of the affected Receivers 108 may correspond to a respective one of the affected receiver nodes.

In one example, the operation may finish in act 508 by determining a packet loss location from the network topology tree 218. Determining the packet loss location may include determining a Lowest Common Ancestor node in the network topology tree 218. The Lowest Common Ancestor node may be the Lowest Common Ancestor of at least two of the affected Receivers 108. The packet loss location may correspond to the Lowest Common Ancestor node.

In a different example, determining the packet loss location may include determining the Lowest Common Ancestor node on a substree 404 and 406 of the network topology tree 218. Determining the packet loss location may further include determining the substree 404 and 406 by determining unaffected Receivers 108.

Network probes installed throughout the network 104 may help determine the source of the packet loss. The network probe may be a device that decodes the packet stream to look for missing packets. However, such network probes may be expensive to deploy especially if the network probes are to monitor all of the locations in the network 104. Probing packet streams for lost packets may also be resource intensive because the packet stream may be encapsulated.

Moreover, known methods used to locate sources of network losses do not work well in networks 104 with low packet loss. For example, methods that use statistics to determine the source of the packet loss may rely on a ratio formed from percentages of packet loss on two respective links of the network topology tree 218. These percentages may be zero in low loss networks resulting in an undefined and/or zero ratio.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
a memory; and
a processor in communication with the memory, the memory including:
a loss signature correlator executable with the processor to identify a plurality of affected receivers that each failed to receive at least one packet identified within a packet stream, wherein the at least one packet fails to be received by all of the affected receivers, and wherein a loss signature received from the affected receivers identifies the at least one packet; and
a network loss locator executable with the processor to determine a packet loss location of the at least one packet from a network topology tree, wherein the network topology tree includes a model of a logical network over which the packet stream was transmitted from a stream source to the affected receivers, and the packet loss location corresponds to a lowest common ancestor node of at least two of the affected receivers.

2. The system of claim 1, wherein the lowest common ancestor node is a network node in the logical network that is closest to all of the affected receivers and that includes all of the affected receivers as descendants.

3. The system of claim 1, wherein the loss signature correlator is further executable to determine an unaffected receiver identifier, wherein the unaffected receiver identifier identifies an unaffected receiver, and the unaffected receiver received a packet included in the at least one packet failed to be received by each of affected receivers.

4. The system of claim 3, wherein the network loss locator is further executable to determine the lowest common ancestor node from a subtree of the network topology tree, and the subtree excludes from the network topology tree at least one network node on a path between the stream source and the unaffected receiver.

5. The system of claim 1, wherein the loss signature includes a Packet Identifier (PID) and a Bitmask of Lost Packets (BLP) and the PID and the BLP are included in a Real-time Transport Control Protocol packet.

6. The system of claim 1, wherein the loss signature is included in a Real-time Transport Control Protocol (RTCP) Extended Report (XR) RLE Report Block.

7. The system of claim 1, wherein the loss signature includes a Packet Identifier and a Continuity Counter, and wherein the Packet Identifier and the Continuity Counter are included in a Moving Pictures Export Group (MPEG) Transport Stream (TS).

8. At least one non-transitory tangible media comprising computer executable instructions executable with a processor to:
identify a plurality of affected receivers that each failed to receive a packet of a packet stream, wherein the packet fails to be received by all of the affected receivers, and a failure to receive the packet was reported by the affected receivers; and
determine a packet loss location of the packet from a network topology tree, wherein the network topology tree includes a model of a logical network over which the packet stream was transmitted, the packet loss location corresponds to a lowest common ancestor of at least two of the affected receivers.

9. The tangible media of claim 8, wherein the packet loss location corresponds to the lowest common ancestor of all of the affected receivers.

10. The tangible media of claim 8, wherein the encoded logic when executed is further operable to:
determine a receiver identifier to identify an unaffected receiver, wherein the unaffected receiver received the packet over the network;
determine identification of a plurality of unaffected network nodes, wherein each of the unaffected network nodes is included in a path from a stream source of the packet stream to the unaffected receiver; and
form a subtree from the network topology tree, wherein the subtree excludes the unaffected network nodes, and the lowest common ancestor of at least two of the affected receivers is included in the subtree.

11. The tangible media of claim 8, wherein the encoded logic when executed is further operable to determine a loss signature as a hash value of data, and the data includes a packet identifier that identifies the packet within the packet stream.

12. The tangible media of claim 8, wherein the encoded logic when executed is further operable to generate a trap in a fault management system, wherein the trap includes the packet loss location and a stream identifier to identify the packet stream.

13. The tangible media of claim 8, wherein the encoded logic when executed is further operable to determine a number of the affected receivers that receive the packet stream over a determined period of time.

14. A method to locate a source of a packet loss comprising:
receiving a plurality of loss signatures over a network with a processor;
determining a loss signature from among the loss signatures that is received from a plurality of affected receivers in the network, the loss signature identifying, within a packet stream, at least one packet that each one of the affected receivers failed to receive, wherein the at least one packet fails to be received by all of the affected receivers;
determining a packet loss location of the at least one packet from a network topology tree of at least a portion of the network, wherein the network topology tree includes a stream source of the packet stream and the affected receivers, and determining the packet loss location includes determining a lowest common ancestor of at least two of the affected receivers.

15. The method of claim 14, wherein the packet stream corresponds to an Internet Protocol multicast group address.

16. The method of claim 14, wherein the loss signature only uniquely identifies the at least one packet during a determined time period.

17. The method of claim 14, wherein the loss signature identifies the at least one packet by identifying a first sequence number associated with a first packet and a second sequence number associated with a second packet.

18. The method of claim 14, wherein determining the lowest common ancestor node includes traversing the network topology tree in an Euler tour.

19. The method of claim 14, the method further comprising determining an identity of a plurality of unaffected receivers, wherein each of the unaffected receivers received the at least one packet.

20. The method of claim 19, wherein determining the packet loss location further comprises locating a plurality of network nodes on a path from a stream source of the packet stream to the unaffected receivers, and wherein determining the lowest common ancestor includes excluding any of the unaffected receivers and the network nodes as descendents of the lowest common ancestor.

* * * * *